S. Hughes,

Metallic Roofing.

No. 4,198. Reissued Dec. 13. 1870.

Witnesses:
John Becker
D. S. Mabee

Inventor:
S. Hughes
Per Munn & Co
Attorneys.

N. PETERS, PHOTO-LITHOGRAPHER, WASHINGTON, D. C.

United States Patent Office.

SEYMOUR HUGHES, OF HUDSON CITY, NEW JERSEY.

Letters Patent No. 103,887, dated June 7, 1870; reissue No. 4,198, dated December 13, 1870.

IMPROVEMENT IN METALLIC ROOFINGS.

The Schedule referred to in these Letters Patent and making part of the same.

*To all whom it may concern:*

Be it known that I, SEYMOUR HUGHES, of Hudson City, in the county of Hudson and State of New Jersey, have invented a new and improved Metal Roofing; and I do hereby declare that the following is a full, clear, and exact description thereof, which will enable others skilled in the art to make and use the same, reference being had to the accompanying drawing forming part of this specification.

Similar letters of reference indicate corresponding parts.

This invention has for its object to so construct the plates of a metallic roofing that the upright joints formed between them may be entirely water-tight, without interrupting the flow of water on the roof. Heretofore such joints, especially at the corners where four plates meet, could not be made satisfactorily water-tight.

The invention consists chiefly in the employment of sheets of peculiar form, whereby but three sheets can meet at any one point.

The invention also consists in the use of a water-proof fabric which is put within the joints to allow expansion and contraction and still make tight joints.

The invention also consists in the arrangement of projecting transverse joints, together with longitudinal projecting joints. Where roofs were made with projecting joints they were heretofore always made with longitudinal joints only, so as to form long water-channels; but in such roofs the lateral joints between the roofing-plates were not constructed with a view to permit expansion and contraction. By the use of projecting transverse joints I provide for proper expansion throughout the roof, as the projecting joints are yielding, which is well known.

Finally, the invention consists in providing water-passages at the junctions of the projecting lateral and transverse joints, by interrupting the projections at junctions.

Figure 5:
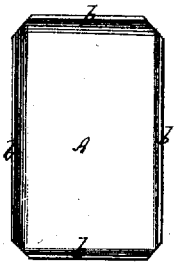
Figure 5 is a plan view of one of the plates used on the roof.
Figure 6:
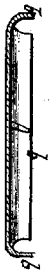
Figure 6 is a longitudinal section of the same.

A, in figs. 5 and 6 of the drawing, represents a sheet as I employ the same on my improved roof.

This plate has its edges turned up, but rounded, and not at sharp angles, and at the corners it is clipped, to become octagonal, as shown.

Figure 1:
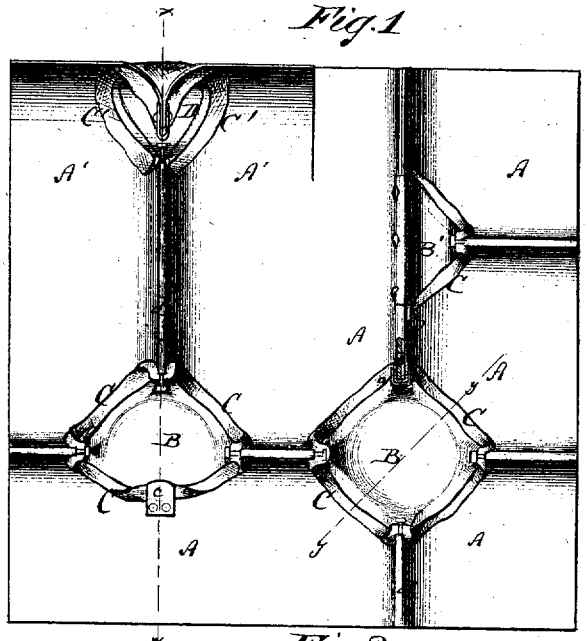
Figure 1 represents a plan or top view of a section of a roof provided with my improved joints.
Figure 3:
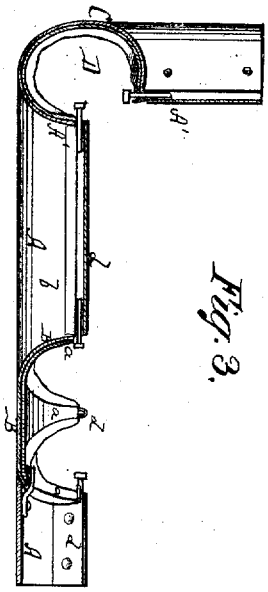
Figure 3 is a vertical section of the same, taken on the plane of the line *x x*, fig. 1.
Figure 2:
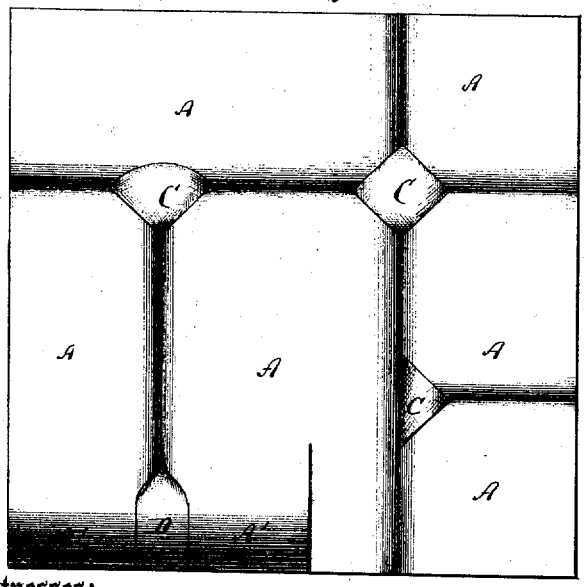
Figure 2 is an inverted plan view of the same.

When a number of these plates are put together they will, where the four corners meet, leave room for the insertion of a lozenge-shaped plate, B, which has its corners elevated and bent outwardly, as at *a a*, in fig. 1, to embrace with each projecting corner-piece the upward projecting flanges *b* of two adjoining plates, A.

Figure 4:
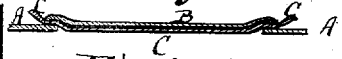
Figure 4 is a detail vertical section of the same, taken on the plane of the line *y y*, fig. 1.

Between the corners *a* the plate B is so bent as to rest upon and conform to the shape of the plate A, as shown. It merely overlaps the said plates, as shown in fig. 4.

C C are pieces of fabric interposed between the plates B and A.

This fabric is soaked with asphaltum or other equivalent matter, whereby it is made impervious to and a non-conductor of water. It keeps the joints between A and B water-proof, without the use of solder, rivets, or other fastening devices, and permits, consequently, full expansion and contraction of said plates, without any danger to the joints.

Thus it will be seen that the projecting flanges *b* at sides and ends of plates form lateral and longitudinal joints, which allow the plates to expand in all directions, and that the clipped corners and plates B interrupt the projecting joints at their junctions, and constitute water-courses. Such water-courses are thus provided at the corners of all plates.

Sheets C′, similar to C, are interposed between the metal sheets D A′, which form the gutter, as shown.

For some cases, where but three plates A are joined, it may be necessary to use but half a lozenge-plate, as at B, and in some cases the fabric C may be confined to the plate B by an ear, *c*, fastened to the plate A.

Figure 7:
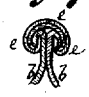
Figure 7 is a detail vertical section of one of the joints.

The contiguous edges *b b* of the plates A A are either merely covered by a U-shaped cap, *d*, or they may, as in fig. 7, be turned out and receive a cap, *e*, which has its edges bent up, while a piece, *f*, of water-proof fabric is fitted between the two. This latter form of joint will also do away with all rivets, and will permit free expansion and contraction.

Having thus described my invention,

I claim as new and desire to secure by Letters Patent—

1. The roofing sheets A, clipped at the corners to receive the lozenge-shaped joint-pieces B, as set forth.

2. The water-proof fabric C, interposed between the plates A B of a metal roof, to permit expansion and contraction of said plates, as set forth.

3. A roof having longitudinal and transverse projecting joints between the several pieces, when the intersections of the said joints are covered by the piece B, in the manner described.

SEYMOUR HUGHES.

Witnesses:

A. V. BRIESEN,

ALEX. F. ROBERTS.